United States Patent [19]

Emerson et al.

[11] Patent Number: 4,612,416

[45] Date of Patent: Sep. 16, 1986

[54] INTEGRATED MESSAGE SERVICE SYSTEM

[75] Inventors: William D. Emerson, Boulder; Deborah J. Hill, Denver; Karen C. Loeb, Englewood; Albert Mizrahi; Charles T. Schlegel, both of Boulder, all of Colo.; Lowell C. Scott, Old Bridge, N.J.

[73] Assignee: AT&T Information Systems Inc., Holmdel, N.J.

[21] Appl. No.: 693,474

[22] Filed: Jan. 22, 1985

[51] Int. Cl.[4] .......................................... H04M 1/64
[52] U.S. Cl. .............................. 179/6.11; 179/6.17; 179/18 B
[58] Field of Search ............... 179/6.03, 6.06, 6.07, 179/6.17, 6.11, 18 B; 369/29

[56] References Cited

U.S. PATENT DOCUMENTS

| 3,728,486 | 4/1973  | Kraus          | 179/6.17  |
| 3,935,389 | 1/1976  | Waldman        | 179/6.11  |
| 4,133,030 | 1/1979  | Huettner et al.| 364/200   |
| 4,150,405 | 4/1979  | Sato           | 179/6.07  |
| 4,221,933 | 9/1980  | Cornell et al. | 179/6.17  |
| 4,488,004 | 12/1984 | Bogart et al.  | 179/18 AD |
| 4,540,856 | 9/1985  | Fujii et al.   | 179/6.11  |
| 4,549,046 | 10/1985 | Mock et al.    | 179/6.11  |

OTHER PUBLICATIONS

Hanson et al., "New Custom Calling Services", Bell Laboratories Record, Jun. 1980, vol. 58, No. 6, pp. 174, 176–180.

Anderson et al., "Mass Announcement Subsystem", Bell System Technical Journal, vol. 60, No. 6, Jul.-Aug. 1981, pp. 1083–1108.

"Store & Forward Voice Switching", International Resource Development Inc., Jan. 1980, Report #145, pp. 45–56.

Primary Examiner—Donald McElheny, Jr.
Attorney, Agent, or Firm—James M. Graziano

[57] ABSTRACT

This integrated message service system provides a user both with an indication of which of a plurality of message service systems contain unretrieved messages and access to these unretrieved messages. This is accomplished by the serving telephone switching system maintaining a translation memory that indicates both the type of message services assigned to each user and the location of unretrieved messages in the assigned message services. The translation memory is updated every time a user creates a new message or accesses a previously stored message. The serving telephone switching system forwards all unretrieved messages from all the message service systems to a user when the user has accessed any one of the message service systems. This eliminates the need for a user to access all assigned message service systems to retrieve messages.

19 Claims, 4 Drawing Figures

FIG. 4

| EXT. # | MESSAGE SERVICE SYSTEM AUTHORIZATIONS | | ... | MESSAGE WAITING INDICATIONS | | ... |
|---|---|---|---|---|---|---|
| | VOICE MAIL | MESSAGE CENTER | | VOICE MAIL | MESSAGE CENTER | |
| 100 | 1 | 1 | ... | 0 | 1 | ... |
| 101 | 0 | 1 | ... | 0 | 1 | ... |
| 102 | 1 | 0 | ... | 0 | 0 | ... |
| ... | | | | | | |

INTEGRATED MESSAGE SERVICE SYSTEM

CROSS-REFERENCE TO RELATED APPLICATIONS

The following U.S. application, which is assigned to the same assignee as the instant application and filed concurrently therewith, has related subject matter:

(1) "Integrated Message Service System", Ser. No. 693,334 by Emerson et al.

FIELD OF THE INVENTION

This invention relates to message service systems and, in particular, to a voice mail service system that is integrated with other message services. The telephone switching system that serves the subscriber provides a number of message services (voice mail, message center, etc.) and integrates the control of these services so the subscriber is provided with a single indication of the location of all messages awaiting retrieval on all message service systems and the ability to retrieve these messages from any one of the message service systems.

BACKGROUND OF THE INVENTION

Message services is the term used to collectively identify the various office automation systems associated with a telephone switching system. These systems are used to improve the productivity of the white collar worker in an office environment by providing an asynchronous voice (or short text message) communication medium.

The Voice Mail Service (VMS) system is one example of these message services. The voice mail service system offers two distinct communication features: Voice Mailbox (VM) and Call Answering (CA). The voice mailbox feature involves a telephone user calling the voice mail service system by dialing an access code using the touch-tone pad on the station set, identifying one or more message recipients who are also connected to the PBX by dialing their station numbers using the touch-tone pad, and leaving a voice message for later delivery by the voice mail service system to the designated recipients. The delivery of the voice message may be immediate or at a scheduled time specified by the message originator. The delivery is passive in that the vocie mail service system places the message in a mailbox assigned to each identified recipient and activates the recipient's message waiting indicator instead of actively calling the recipient to playback the message. The recipient may then access the voice mail service system to save the message for subsequent action, listen to the message, delete it, append comments and route the message to other recipients, or reply and return the message to the originator.

The call answering feature of voice mail service is geared to the convenience of the message recipient, unlike the voice mailbox feature that is geared towards aiding the message originator. The nonavailability of an individual to answer a telephone call results in that call being redirected to the voice mail service system call answering feature. The caller receives a prerecorded message from the absent individual or a system-provided prerecorded message and can then leave a voice message in the absent individual's voice mailbox.

The difficulty with existing voice mail service systems is that a user must query this system as well as all the other message service systems to locate and retrieve all messages. In the case where the user's telephone station set is equipped with a single message waiting indicator, the lighted indicator indicates only that any one or more of the message services contains an unretrieved message. The user must still poll all message services to locate and retrieve these messages.

SUMMARY OF THE INVENTION

The subject integrated message service system provides a user both with an indication of which message services contain unretrieved messages whenever a user accesses any of the message services and with the ability to request that more information regarding these unretrieved messages be forwarded to the user via the system the person is currently using. The telephone switching system provides coordination for all the message services and also controls the message waiting indicator on each user's telephone station set. The telephone switching system maintains a translation memory for every extension served by the telephone switching system to store a translation table indicating the types of message services assigned to the user and data in the translation table also indicate whether this subscriber has or does not have unretrieved messages in the assigned message service systems. When a subscriber accesses any one of these message systems, the accessed message service system receives a message from the telephone switching system via a data communication interface unit to provide the current message waiting status for each message service. If messages exist on other message service systems, an announcement (in the case of voice mail service) will tell the subscriber which message service systems to contact next. At this point, the subscriber could request that more information regarding the unretrieved messages stored on other message service systems be forwarded to the subscriber. The telephone switching system provides the logical "OR" of the indications from the various message service systems to control the message waiting indicator for each extension. The telephone switching system also provides the message retrieval function by passing the unretrieved messages from the assigned message service systems to the user via the accessed message service system.

The system processor of the telephone switching system performs the message waiting indication database management function for the various message service systems. The system processor is connected via a data communication interface unit to the processor in each message service system. The system processor can thereby communicate with each message service system to collect information about unretrieved messages for each telephone extension served by the telephone switching system. The system processor updates the translation table in response to "message created" or "message accessed" signals from the various message services. The system processor is also used to forward the information regarding unretrieved messages from one message service system to another.

Whenever a subscriber dials the access number for one of the message service systems, the system processor activates the switching network of the telephone switching system to establish a voice communication connection to the designated message service system. The system processor concurrently transmits a data message via the data communication interface unit to the processor that controls the designated message service system. This data message identifies the calling party extension and the unretrieved message status of the calling party. The designated message service system can thereby provide an appropriate response to the calling party to indicate the location of unretrieved messages in all the message service systems. The calling party can then request that the unretrieved messages be forwarded. This request is transmitted by the designated message service system to the system processor via the data communication interface unit. The system processor converts the received request into a message retrieval control message that is transmitted by the system processor to the message service systems containing the unretrieved messages, as designated by the translation table, via the data communication interface unit. Upon receipt of the message retrieval control message, a message service system reads out the requested message stored therein to the requesting system via the data communication interface unit. The requesting message service system then provides this message to the calling party.

In this manner, a calling party can retrieve all messages stored on all message service systems by simply accessing one message service system. The subject message service system integrates the various diverse message services into a single office automation system.

BRIEF DESCRIPTION OF THE DRAWING

FIG. 4 illustrates the memory structure in the telephone switching system that supports the integrated message service feature.

DETAILED DESCRIPTION

Figure 1:
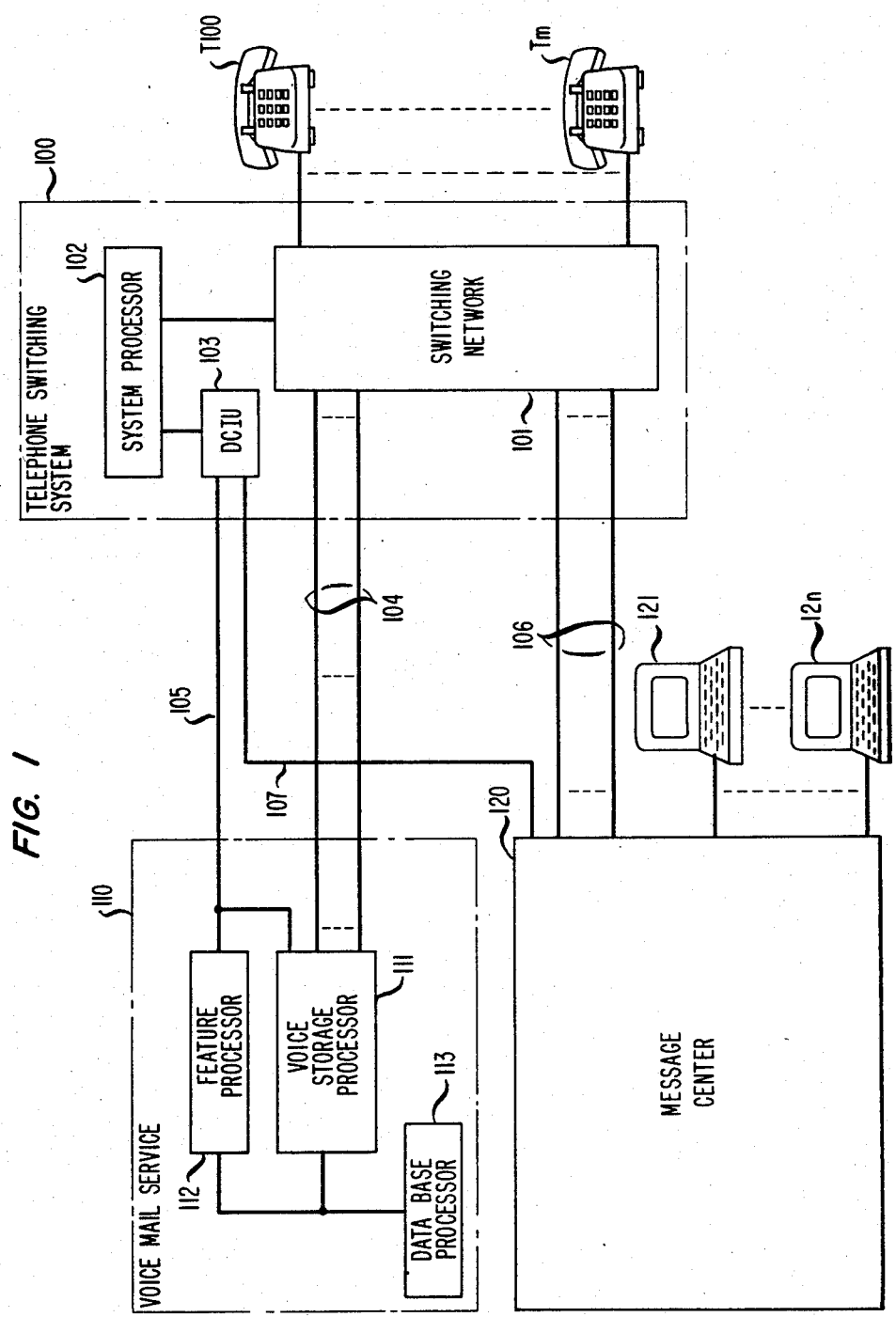
FIG. 1 illustrates the subject integrated message service system in block diagram form.

The subject integrated message service system and the business communication system of which it is a part is shown in block diagram form in FIG. 1. A key element of this business communication system is a stored program controlled telephone switching system 100 that provides business communication services to a plurality of subscriber stations T100-Tm. Included in telephone switching system 100 is a switching network 101 for establishing communications connections among subscriber stations T100-Tm. A system processor 102 controls the operation of telephone switching system 100. The business communication system of FIG. 1 includes several message service systems such as voice mail service system 110 for electronically storing and forwarding voice messages and message center service system 120 for having operators at consoles 121-12n record messages for callers. These systems are known in the art and, to illustrate the subject integrated message service system, voice mail service 110 will be described in further detail below.

Telephone switching system 100 provides each user with access to message services such as voice mail service. Users can directly call voice mail service system 110 or can redirect their incoming calls to voice mail service system 110. Telephone switching system 100 provides a data communication interface unit (DCIU) 103 and a data link 105 connection to voice mail service system 110 to exchange call related information such as: new call, call disconnect, message waiting indication control, etc.

A user initiates an access to voice mail service system 110 to, for example, generate a voice mail message by going off hook on the user's associated telephone station set T100 and dialing the voice mail service system access number. The system processor 102 receives and decodes the dialed number in well-known fashion and connects telephone station set T100 to one of the voice mail service access trunks 104 via switching network 101. This establishes a voice communication connection from telephone station set T100 via switching network 101 and voice mail service access trunks 104 to voice mail service system 110.

At the same time that this voice communication connection is being established, system processor 102 transmits a data message identifying the calling party to voice mail service system 110 through the data communication interface unit 103 and over data link 105. Once a data message comes over data communication interface unit 103 from telephone switching system 100 announcing a new call, voice storage processor 111 and feature processor 112 interact directly with the user to provide the required features. The voice storage processor 111 controls the sequencing of that call until a disconnect is received. The voice storage processor 111 is comprised of many different elements working together to provide voice encoding capability. The hardware necessary to digitize voice and successfully buffer it before storing it in data base processor system 113 is part of voice storage processor 111.

Feature processor 112 provides the various system level features associated with voice mail service, such as mailing lists, message delivery, etc. The data base processor 113 serves as a mass storage element to store all the digitally encoded voice signals as well as control algorithms used by voice storage processor 111 and feature processor 112. Additional details of voice mail service system 110 are disclosed below.

In the subject integrated message service system, system processor 102 maintains a record of the location of messages for each user in telephone switching system 100. The data message (noted above) that is transmitted by system processor 102 to voice storage processor 111 via data communication interface unit 103 and data link 105 on the initial call connection to voice mail service system 110 includes data relating to the presence/absence of messages stored on the various message service systems (such as message center 120) for the user at telephone station set T100.

Voice mail service system 110 provides a prerecorded announcement to the user to note the location of these messages. Feature processor 112 receives the data message from system processor 102 and determines what is the required content of the prerecorded announcement based on the data in the data message. Feature processor 112 then activates voice storage processor 111 to retrieve the appropriate prerecorded announcement from data base processor 113 and provide same to the user. After the announcement, the user may request additional information regarding unretrieved messages stored in other message service systems be forwarded through system processor 102 back to voice mail service system 110. The details of the call completion, data message structure and message retrieval will be discussed below. The structure of voice mail service system 110 and data communication interface unit 103 are first described to provide background for that description.

VOICE MAIL SERVICE SYSTEM

Figure 2:
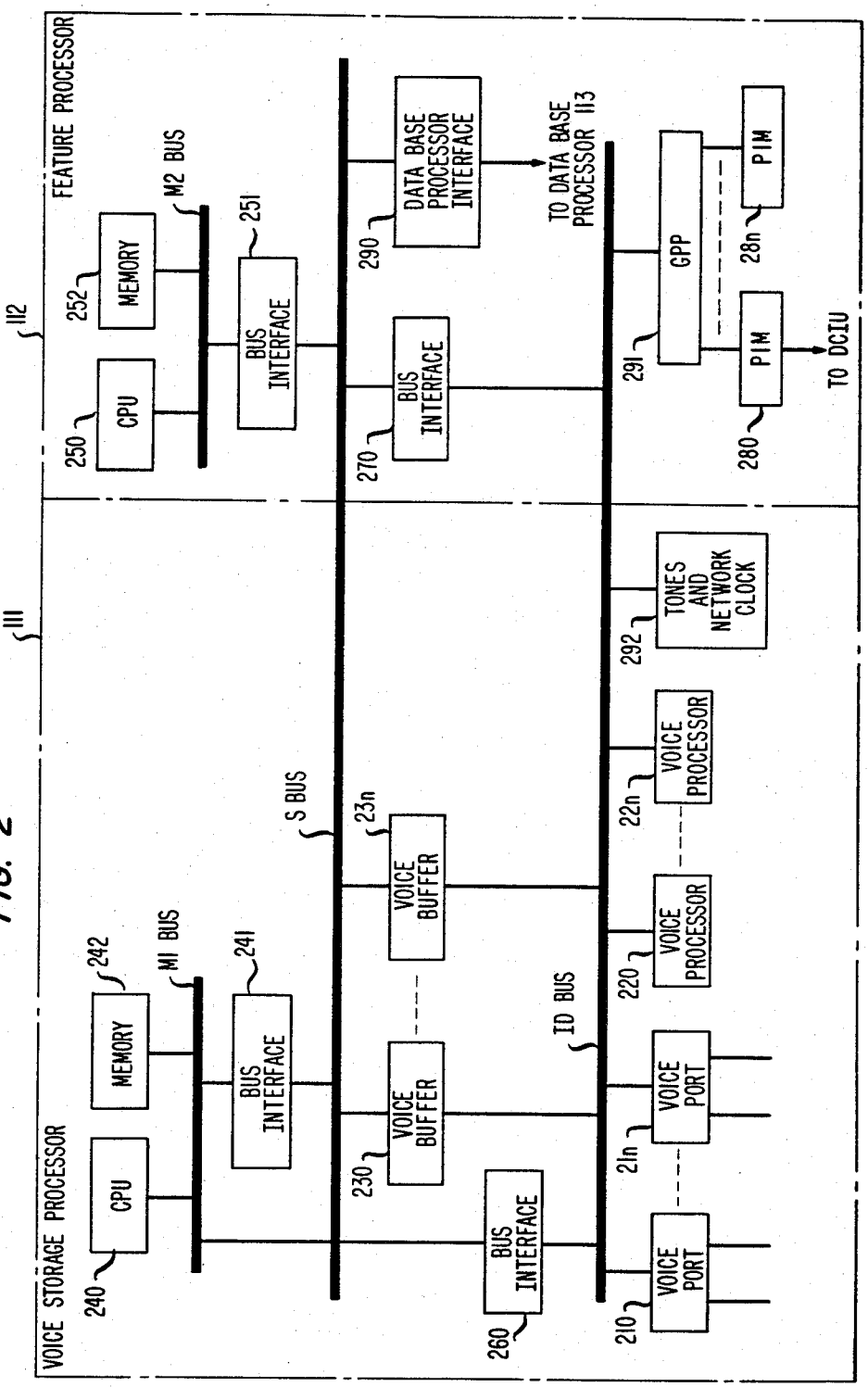
FIG. 2 illustrates the voice mail service system in block diagram form.

The voice mail service system 110 is disclosed in block diagram form in FIG. 2. This system comprises three main elements: voice storage processor 111, feature processor 112 and data base processor 113 (not illustrated). Broadly stated, the voice storage processor controls the following:

a. Keeping track of control information about current voice messages being played or recorded, including where in the message the caller stopped playback, and whether the caller is playing back or recording.
b. Opening voice channels in preparation for recording or playback.
c. Closing voice channels to end recording or playback.
d. Controlling playback speed.
e. Controlling playback volume.

Feature Processor 112 controls the following functions:

a. Controlling message headers—how they are read and created.
b. Concatenating two messages together, or duplicating a voice message.
c. Erasing a message (includes telling the data base processor system to deallocate all extents associated with this message).
d. Rewinding a message.
e. Keeping track of problems so that information can be provided to the caller when questions arise.
f. Retrieving messages from a caller's mailbox and preparing to play back both the message summary and the message body.
g. Skipping to the next message (if any).
h. Saving a message for later playback (becomes an old message in the mailbox).
i. Verifying the password typed in by the caller.
j. Retrieving distribution lists to later send out messages.
k. Controlling the delivery of messages.
l. Storing a working message, one per subscriber.
m. Retrieving initial lists of all messages (both new and old) in a user's mailbox.
n. Deleting a message and clearing up the disk space for later use.
o. Retrieving a list of outgoing messages to report the status of each.
p. Canceling the delivery of a piece of undelivered mail.
q. Notifying system processor when all messages are accessed.

DATA BASE PROCESSOR

Data base processor system 113 is a back-end file system and data base machine. As a back-end processor, data base processor system 113 serves to offload file system and data base operations from voice storage processor 111. It also provides all the non-volatile storage used by the voice storage processor 111.

Both voice and non-voice files are stored by data base processor system 113 for voice mail service system 110. The voice files will include announcements and messages. The non-voice files will include system programs, system data, and user data. Data base processor system 113 provides basic file system support for voice mail service with functions which include, but are not limited to: File system management functions (e.g., create, modify, delete, backup, recover, and report status of files and file systems); File manipulation functions (e.g., insert, modify, delete data in a file); File level concurrency control functions; Data base processor system administration functions; Data base processor system maintenance functions.

VOICE PROCESSORS

The voice processors (220-22n) and the voice ports (210-21n) take care of the following physical operations: Touch-tone signal receiving; Answer, disconnect; Ring detection; Digit queuing; Bandwidth compression (compress the voice data from 64k bits/s down to 16k bits/s); Silence compression (encode the length of long silences so that the encoded lenth value rather than the actual silent interval can be stored on disk); Playback speed control (speed-up or slow-down the rate of playback); Playback volume (louder or softer); Automatic gain control; Per port timing (inter-token timing); Freezing a voice channel to temporarily stop recording or playback; Applying audible tone right before recording to signal the caller to begin; Monitoring how much is recorded, and freezing the channel when a maximum is reached.

VOICE INTERFACE OPERATION

When telephone switching system 100 establishes a voice communication connection from the user at telephone station set T100 to one of voice mail service access trunks 104, ringing will be applied to the selected voice mail service access trunk. No action will be taken by voice mail service system 110 due to this ringing signal. The call will be answered without regard to the presence or absence of ringing on the associated line when a connect message identifying an incoming call on a voice mail service access trunk 104 is transmitted to voice mail service system 110 by system processor 102 via data communication interface unit 103 and data link 105. After closing the loop on the selected voice mail service access trunk 104 as an answer signal, voice storage processor 111 will monitor the flow of loop current on this trunk to insure a complete connection.

When telephone switching system 100 disconnects a call from a voice mail service access trunk 104, no immediate signal is sent over the trunk to voice mail service system 110. If a disconnect message identifying an existing connection is received by voice storage processor 111, the loop wil be opened on the voice mail service access trunk 104 for a time sufficient to be recognized as an on-hook signal by telephone switching system 100.

A plurality of voice ports (201-21n) system 110, each of which is connected to a corresponding one of voice mail service access trunks 104. The user at telephone station set T100 activates the desired feature of voice mail service system 110 in well known fashion by simply dialing a code designating the desired feature. To illustrate, assume the user wishes to create a voice message for transmittal to a number of destinations. The user dials the "create" digit on telephone station set T100, which dialed digit is transmitted via the voice communication connection to voice port 210 and thence via TD bus to tone detector circuit 292. Tone detector circuit in voice processor 220 decodes the dialed digit and transmits a data message to CPU 240 via TD bus, bus interface 260 and M1 bus. CPU 240 interprets this data message and causes a voice connection to be established from voice port 210 to a voice processor 220 where the voice message is converted to digitally encoded voice signals. These voice signals are transmitted via TD bus, a selected voice buffer 230, S bus, data base processor interface 290 to data base processor 113 where the encoded voice is stored for later retrieval.

HANDSHAKING BETWEEN DATA BASE PROCESSOR 113 AND VOICE BUFFER 230

A command from the voice storage processor 111 via M1 bus, bus interface 241 and S bus tells data base processor system 113 and voice buffer 230 to set up a common channel for recording or playback. When the user signals that he or she is ready to record or play, the voice storage processor 111 is notified and it immediately informs data base processor system 113 and voice buffer 230 to start the operation.

If the operation is to record a message, data enters voice buffer 230 from voice processor 220 via TD bus. Voice buffer 220 buffers the data and delivers it to data base processor system 113 via S bus and data base processor interface 290.

If the operation is to playback a message, voice buffer 230 interacts with data base processor system 113 to receive data from data base processor system 113 through data base processor interface 290 and S bus. Voice buffer 230 buffers the data and delivers the data to voice processor 220 via TD bus.

This voice mail service system 110 outlined above is a standard commercially available voice mail service system known as AUDIX that is available from AT&T Information Systems. The exact operation of this system is not of paramount importance, but is described in general fashion to provide a better understanding of the subject integrated message service system. The data communication segment of this arrangement is now disclosed to illustrate the apparatus which interconnects system processor 102 with voice mail service system 110 to provide an integrated message waiting indication.

DATA COMMUNICATION INTERFACE UNIT

The Data Communication Interface Unit (DCIU) 103 of telephone switching system 100 is used to connect the voice storage processor 111 to system processor 102. Data communication interface unit 103 and other hardware components, the protocol, and the types of messages on this interface are described in this section.

Data communication interface unit 103 is necessary for the operation of the voice mail service system 110. Voice storage processor 111 needs a connect message to know when to answer a voice mail service access trunks 104, because it does not act on ringing on the voice mail service access trunks 104. The connect message also informs voice storage processor 111 if the call is a Voice Mail call or a Call Answer call. The data communication interface unit 103 is needed for the control of the automatic message waiting indicators, and the integration of the lamp message waiting indication feature with other services.

Figure 3:
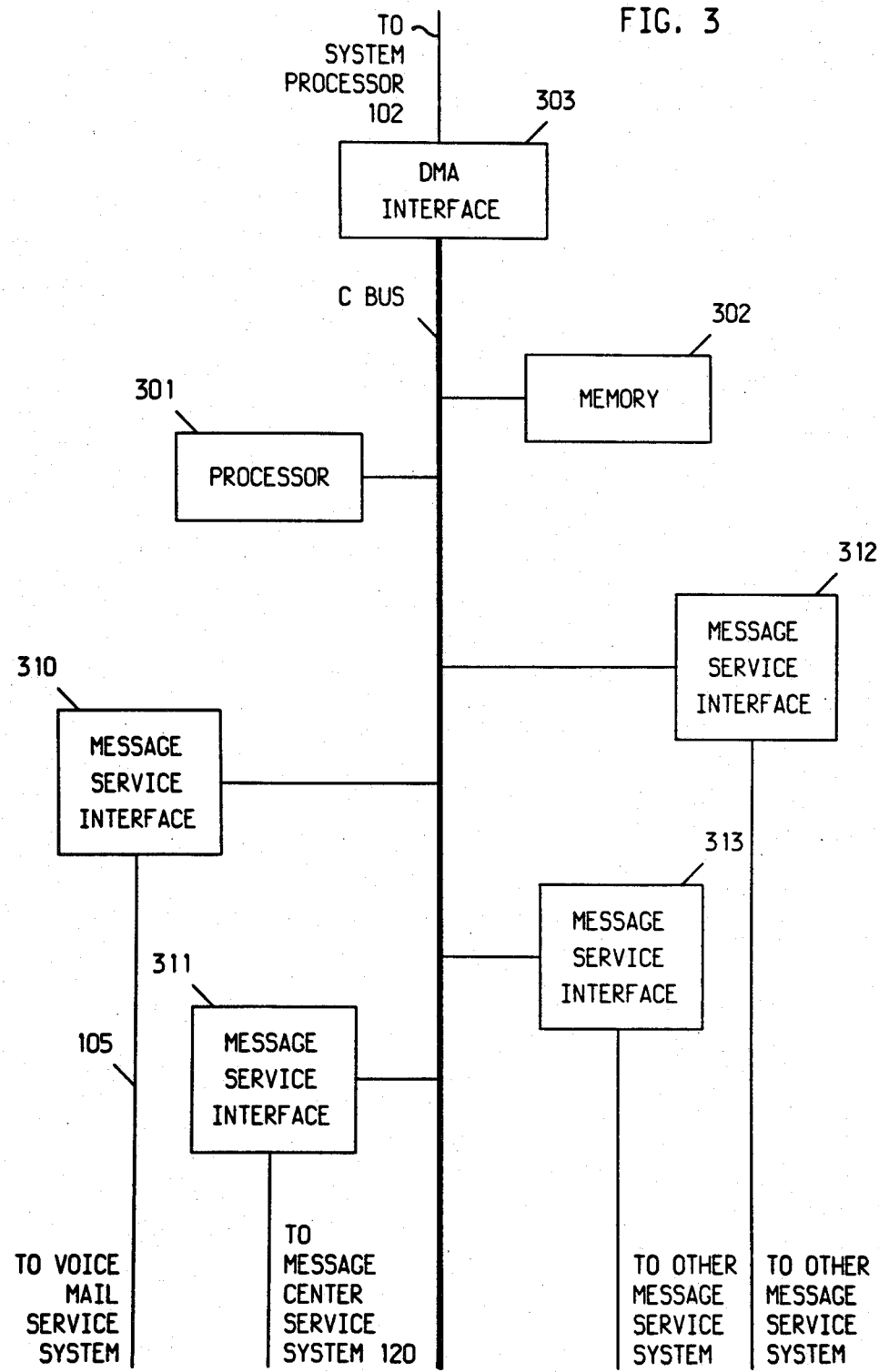
FIG. 3 illustrates the data channel interface unit in block diagram form.

The general structure of data communication interface unit 103 is illustrated in FIG. 3 in block diagram form. This circuit is a data transfer arrangement which functions to transmit a message from a main memory to a communication channel. Such circuits are well-known and U.S. Pat. No. 4,133,030 issued Jan. 2, 1979 to R. E. Huettner et al describes one such arrangement. The Huettner et al patent provides a block transfer arrangement but the concepts taught therein are applicable to the message transmission arrangement of data communication interface unit 103.

The operation of data communication interface unit 103 is controlled by processor 301 which is programmed by software stored in memory 302. Processor 301 responds to message arriving either at interface 303 from system processor 102 or at message services interface 310-313 from one of the message service systems by reading the message from the receiving interface circuit via common bus CBUS. The message is routed by processor 301 to the interface circuit that serves the intended destination. This is described in further detail below.

PROTOCOL BETWEEN VOICE MAIL SERVICE SYSTEM 100 AND TELEPHONE SWITCHING SYSTEM 100

The sections that follow summarize the relevant points of the protocol.

PHYSICAL-LAYER 1

The data communication interface unit 103 communicates with other devices through the physical data links. The data communication interface unit 103 has 8 data links for connecting system processor 102 to a maximum of 8 other processors. Also, it can provide a connection between any of the other processors without involving system processor 102. (See F. J. Bogart et al U.S. Pat. No. 4,488,004 issued Dec. 11, 1984, for additional details.) Each data link will have a maximum 19.2k bits/s data rate. A DMA interface circuit 303 is used to connect data communication interface unit 103 to processor 102. However, it is appropriate to regard this DMA connection as a ninth Data link. In summary, data communication interface unit 103 will support 9 data links, one of which is a connection to system processor 102 via DMA interface 303.

The data communication interface unit communication with voice storage processor 111 is through a Processor Interface Module (PIM)(280-28n), which is in turn connected to the General Purpose Port (GPP) 291 on the voice storage processor 111 side. On the voice storage processor 111 side, the general purpose port 291 is connected to switching communication processor 270 through the TD bus. General purpose port 291 will provide a total of 4 physical links. One will be connected to data communication interface unit 103 via processor interface module 280 and the others will be available for connections to other devices, via other processor interface modules. The conceptual view of these data links is that these are 5 data links; 4 are physical cables that are connected to general purpose port 291, the fifth data link is the DMA connection across the S bus to Feature Processor CPU 250.

DATA LINK-LAYER 2 AND PACKET-LAYER 3

Level 2 handles the sending of packets of data over the physical link and provides flow control, error detection, and error recovery.

Level 3 creates logical channels that are used to multiplex packets over one data link. Each data link in the data communication interface unit 103 will support 64 logical channels, that can be uniquely identified with the data link number and logical channel number.

On the system processor 102 side of the interface, data communications interface unit 103 handles levels 2 and 3 of the protocol. The data link between system processor 102 and data communication interface unit 103 can support a maximum of 64 logical channels.

All message transmission through data communication interface unit 103 is done through a network channel. A network channel is the name for a connection between 2 logical channels. It is made by mapping a logical channel data link pair to a logical channel data link. Logical channels and therefore network channels support bi-directional communication.

Although there are 64 logical channels on each of the links, not all of these can be used because there is a limit of 128 network channels on each data communication interface unit 103.

On the feature processor 112 side of the interface, the Data Link-Layer 2 and the Network-Layer 3 is handled switch communication processor 270. Switch communication processor 270 is connected to the Time Division (TD) bus and connected to feature processor CPU 250 by means of S bus, bus interface 251 and M2 bus. Bus interface 270 provides the layers of protocol provided by data communication interface unit 103.

SESSION LAYER OF THE PROTOCOL

The session layers correspond to a subset of the combination of the following International Standard Organization (ISO) protocol model layers: the transport layer 4, the session layer 5, and the presentation layer 6. The session layer is called the level 4, it is concerned with sequencing of messages and uses level 3 to provide end to end confirmation of messages. At the boundary between levels 3 and 4, the level 3 logical channels are mapped, one to one, to ports in level 4. These logical channels and ports are translated one to one in numerical order.

In system processor 102, each Application program talks to data communications interface unit 103 via the DCIU Interface Program (DIP). The DCIU interface program implements the session layer of the protocol, and DCIU interface program serves as an interface between data communications interface unit 103 and the system processor application programs.

In voice storage service system 110, the session layer is handled in the VMS Interfaces Program (VIP) which resides on feature processor 112. VIP also communicates with other voice storage processor 111 application processes and passes information between them and system processor 102.

APPLICATION MESSAGES

Data communication interface unit 103 performs a switching function as outlined above. Both system processor 102 and the various message service systems 120 can originate messages which are transmitted through data communication interface unit 103 to a designated destination. The messages transmitted are discussed below and clarify the routing of the message through data communication interface unit 103.

The following descriptions of the content of each message are logical descriptions and not physical formats for implementation. Each message contains a message opcode followed by the content of the message.

SYSTEM PROCESSOR 102 TO VOICE STORAGE PROCESSOR 111

CONNECT MESSAGE:

When a call is switched to the voice mail service access trunks 104 connected to voice storage processor 111, the appropriate information is sent to voice storage processor 111 in a Connect Message. The voice storage processor 111 voice port to which the call is connected is identified by using the ringing extension number. The content of the message is shown below.

Connect—opcode and identification of the message service system.
Ringing Extension—extension number of the port receiving that call.
Call Type—indicates whether calling party is a trunk or a line. If the call is on a trunk it is 'external.' If the call is on a line, it is 'internal.' The opcodes are: (0) means line; (1) means trunk.
Calling Party—is the trunk group number or extension number of the calling party depending on the Call Type.
Reason for Call—why the call is being sent to VMS. The possible reasons are:
Direct—VMS is being called directly.
Redirected—The call was redirected to VMS.
Called Extension—is the original extension number being called. This can be ignored for calls with reasons of type Direct, because it would be the same as the Ringing Extension or Associated Extension.
Switch Message Waiting Indicator Status—is a bit map of the message waiting indicator status of the calling extension for each of several message service systems that use the message waiting indicator. These data are only present for direct calls.

Thus, the message includes both an opcode and an indication of the destination to which this message is intended. Processor 310 decodes the opcode and destination information to determine the one of message service interfaces (ex. 310) to which the message is routed by processor 301. Message service interface 310 responds to a message received from processor 301 over CBUS by transmitting the message to voice mail service system 110 via data link 105.

The transmitted message is received (as described above) by PIM 280 and routed through general purpose port 291, ID BUS, switch communication processor 270, S BUS, bus interface 251, M2 BUS to feature processor CPU 250. Feature processor CPU 250 responds to the received message in standard fashion to complete the voice connection from telephone station set T100 to voice mail service system 110 via the selected voice port (ex. 210). A departure from standard operation is that feature processor CPU 250 responds to the switch message waiting indicator data contained in the received message by retrieving a prerecorded message from the voice store memory provided by data base processor 113. The prerecorded message is transmitted in well-known fashion to voice port 210 and thence to the user at telephone station set T100 via the voice communication connection. The prerecorded message indicates which message service systems (ex. message center 120) have stored therein unretrieved messages for the user at telephone station set T100. Upon the completion of this prerecorded message, voice mail service system 110 returns to standard operation where the user can create or retrieve voice mail messages.

DISCONNECT MESSAGES:

When the user of VMS goes on hook, system processor 102 notifies voice storage processor 111 the call has terminated.

Disconnect—opcode for disconnect and identification of the message service system.
Ringing Extension—ringing extension of the port in the call.

SWITCH MESSAGE WAITING INDICATOR STATUS REQUEST MESSAGE:

When voice storage processor 111 requests system processor 102 for the message waiting indicator status, system processor 102 will respond with this message. This information will be used by VMS to inform the user of the meaning and status of the message waiting indicator. This message must exist even though the Switch message waiting indicator status is sent to voice storage processor 111 in the Connect Message, because the subscriber may be calling from off premise or from someone else's extension. Voice storage processor 111 will discover if this is the case when the subscriber has logged in, and, if needed, use the Switch Message Waiting Indicator Status message to retrieve the information.

Message Waiting Indicator Status—opcode and identification of the message service system.
Extension number—subscriber's extension number
Status for each feature—message waiting indication is on (1), message waiting indication is off (0). Lamp is off (0).
A bit map shows the indicator status of voice mail, message center, electronic document communication and leave word calling services.

VOICE STORAGE PROCESSOR 111 TO SYSTEM PROCESSOR 102

These are the messages that voice storage processor 111 applications send to system processor 102:

AUTOMATIC MESSAGE WAITING (AMW) INDICATOR MESSAGES:

Voice storage processor 111 will send a message to turn on or off the message waiting indicator status for an extension. The message is sent because of one of 4 different stimuli:
when the subscriber's in-mailbox becomes not empty: send "status on";
when the subscriber's in-mailbox becomes empty: send "status off";
when voice storage processor 111 receives a Request Message Waiting Status message: send "status";
when voice storage processor 111 receives a Request Message Waiting message waiting indicator status is on: send "status on."

Data communication interface unit 103 forwards this message to system processor 102 where the data contained in the message is used to update the contents of the translation table in the memory location associated with the designated station.

REQUEST SWITCH MESSAGE WAITING INDICATOR STATUS MESSAGE:

It is used by voice storage processor 111 to ask system processor 102 to send a Switch Message Waiting Indicator Status message to voice storage processor 111 for the extension indicated. This message is used to get the Switch message waiting indicator status of a subscriber for the services that use the message waiting indicator. This message will be sent when the Connect message did not contain the correct Switch message waiting indicator status. This is known when a subscriber has logged into VMS and the subscriber has called from somewhere other than the subscriber's extension.
Request Switch AMW indicator Status—opcode
Extension number—subscriber's extension

TRANSLATION TABLE

The translation table structure is illustrated in FIG. 4. The translation table as discussed above is maintained by system processor 102 in its memory and provides the central database for message service system authorizations and message waiting indications. The translation table (400) of FIG. 4 contains a number of fields: extension (401), message waiting authorizations (410) message waiting indications (420). Translation table 400 can be part of the existing translation table structure used by telephone switching system 100 in defining the services available to each extension or may be a separate table maintained for message service systems.

Translation table 400 is addressed by the extension number in field 401. Thus, in this example, telephone station set T100 is extension number 100, T101 is extension number 101, etc. for all the lines in telephone switching system 100. Field 410 in translation table 400 specifies the message service systems to which each extension is authorized to access. In the example shown in FIG. 4, extension 100 is authorized to access voice mail and message center while extension 101 is only served by message center and extension 102 is only served by voice mail.

A corresponding structure is realized in field 420 that stores an indication of unaccessed messages in the various message service systems for each extension. As can be seen from FIG. 4, both extension 100 and 101 have a message waiting indication due to unretrieved messages in message center message system 120. When the user at telephone station set T100 accesses voice mail service system T100, as described above, the prerecorded announcement produced by voice mail services system 110 would announce that an unretrieved message is stored on message center service system 120.

Thus, system processor 102 provides an integrated message service system by maintaining this common message waiting indication database, thereby eliminating the need for the user to access all message service systems to which the user subscribes in order to locate unretrieved messages.

The user at telephone station set T100, in response to the prerecorded announcement indicating the existence of unretrieved messages stored on other message service systems, can elect to have those unretrieved messages forwarded to the user on the currently accessed message service system. This is accomplished by the user dialing a message retrieval request code at telephone station set T100. Voice mail service system 110 detects this dialed code in well-known fashion, translates the dialed digits, and transmits a message retrieval control message to system processor 102 via data communication interface unit 103. A typical control message is a request for Unretrieved Messages from Other Services Message. This message is used by voice mail service system 110 to request that system processor 102 forward additional information regarding the unretrieved message(s) stored on other message service systems such as message center service system 120 back to voice mail service system 110. This message would be sent after the user has heard the prerecorded announcement indicating which message service systems have unretrieved messages and the user indicates a desire to retrieve those messages.

The format of this message is as follows:
Opcode—indicates a request for additional unretrieved messages
Extension number—subscriber's extension number
Requesting Service ID—identification of the message service system sending this request Number of Messages—indicates the maximum number of messages that can be received by the requesting message service system After this message is received by system processor 102, it would refer to the translation table 400 to verify that there are unretrieved messages for the specified extension on other message service systems. Once verified, system processor 102 would forward the request for unretrieved messages to the appropriate message service system(s). This request for unretrieved messages is transmitted via data communication interface unit 103 to the appropriate message service systems, such as message center service system 120.

The processor at message center service system 120 receives the request for unretrieved messages from data communication interface unit 103. The request message indicates the subscriber's extension number (T100) and the maximum number of messages that can be processed. The processor in message center service system 120 scans its message memory to retrieve all the messages stored therein for the user at telephone station set T100. These messages are formatted into a response message such as an Unretrieved Message(s) from Other Message Services Message. This message is forwarded through the system processor 102 in response to the Request for Unretrieved Messages from Other Message Services Message. The request message is sent after the subscriber to voice mail service system 110 indicates a desire to retrieve messages from another message service system.

The format of this message is as follows:

Opcode—indicates the message is a reply to the request for additional unretrieved messages Extension Number—subscriber's extension number Message Service System ID—identification of the message service system sending this message Number of Messages—contains an indication of the number of unretrieved messages sent in this message Number of Remaining Messages—contains an indication of whether the message service system has any more unretrieved messages. If this field is 0, the last unretrieved message has been sent.

Message Body—this field is repeated for each unretrieved message that is sent. Contains the following information:

Phone Number—phone number of person leaving message

Name—the name of the person leaving the message

Time/Data—the time and date when the message was left

Text—subject of message such as 'Please Call'

This response message is transmitted over data communication interface unit 103 to system processor 102 that then forwards the response message to voice mail service system 110. The response message is decoded into the number of discrete messages contained therein. Each decoded message is then provided to the user requesting retrieval, in the form of an announcement composed of prerecorded segments concatenated together to form the message. The message content is: identification of the message service system, identification of party leaving the message, date/time of message, "canned" message (ex. please call). The user at telephone station set T100 thereby receives all messages by simply accessing one message service system.

An alternative method of retrieving messages from other message service systems is the actual transfer of the calling party to the other message service systems. This is accomplished by system processor 102 responding to the above-mentioned Request for Unretrieved Messages from Other Services Message by initiating a call transfer call processing routine. Telephone station set T100 is transferred from voice mail service access trunk 104 to message center service access trunk 106 by system processor 102. As in the case of voice mail service system 110, system processor 102 concurrently transmits a connect message over data communication interface unit 103 and data link 107 to the processor of message center service system 120. This connect message indicates the identity of the calling party and the purpose of the access—to retrieve messages. Message center service system 120 then processes this request by providing all the stored messages to the user at telephone station set T100.

This alternate method of operation eliminates the need to translate stored messages into a voice announcement as described above or the transmission of messages through data communication interface unit 103 and other message service systems to reach the calling party. In either case, the user need access only one message service system to retrieve all messages stored on all message service systems.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the scope and the spirit of the invention.

What is claimed is:

1. In a business communication system comprising a telephone communication system having a system processor and a plurality of message service systems, wherein said message service systems are each connected to said telephone communication system by communication lines to enable a user on said telephone communication system to access any one of said message service systems designated by said user, a message access system comprising:

exchanging means connected to and interconnecting said plurality of message service systems and said telephone communication system and responsive to a user accessing one of said message service systems for exchanging call related data between said one message service system and said telephone communication system;

means connected to said exchanging means and said system processor and responsive to the appearance of said call related data on said exchanging means for storing an indication of the current message status of said user on said system processor of said telephone communication system; wherein said system processor is responsive to a user on said telephone communication system accessing one of said plurality of message service systems via said communication lines for transmitting said message status associated with said accessing user to said accessed message service system via said exchanging means;

means in each of said message service systems responsive to said transmitted message status for providing an indication of said transmitted message status to said accessing user; and means in each of said message service systems responsive to said accessing user generating a message retrieval request for forwarding, via said exchanging means and said one message service system, unretrieved messages for said accessing user stored on other than said one message service system.

2. The system of claim 1 wherein said exchanging means includes:

a plurality of data link means connected on a one-to-one basis between the system processor of said telephone switching system and each of said plurality of message service systems.

3. The system of claim 2 wherein said message service systems include:

means responsive both to the creation and the accessing of messages stored therein for sending signals indicative of said creation and accessing to said system processor via said associated data link.

4. The system of claim 3 wherein said storing means is connected to said system processor and includes:

means responsive to said signals for maintaining a record of the existence and location of said messages on a per user basis.

5. The system of claim 4 wherein said transmitting means is connected to said system processor and includes:

means responsive to a user accessing one of said message service systems for retrieving said record associated with said user from said maintaining means and transmitting same to said one message service system via said associated data link.

6. The system of claim 5 wherein each of said message service systems include:

means responsive to said transmitted record for providing said indication to said user via said communication line serving said user.

7. The system of claim 2 wherein said system processor includes:

means responsive to said message retrieval request for broadcasting a user retrieval request via said data link means to all of said message service systems having unretrieved messages for said user as identified by said storing means; and means responsive to said unretrieved messages returned on said data link means by said identified message service systems for routing said unretrieved messages to said user via said data link connecting said system processor to said one message service system.

8. The system of claim 2 wherein said system processor includes:

means responsive to said message retrieval request for transferring said user to said communication lines associated with another one of said message service systems having unretrieved messages for said user as identified by said storing means; and means responsive to said transferring means for broadcasting a user retrieval request to said another message service system identifying said user.

9. In a business communication system which comprises a telephone communication system and a plurality of message service systems, where said message service systems are connected to said telephone communication system by communication lines which provide users on said telephone communication system with dial access to said message service systems, an integrated message access system comprising:

exchanging means connected to and interconnecting said plurality of message service systems and said telephone communication system and responsive to a user accessing one of said message service systems for exchanging call related data between said one message service system and said telephone communication system;

means responsive to a user on said telephone communication system dialing the access number of one of said message service systems for establishing a communication connection from said user to said one message service system via one of said communication lines;

means in said telephone communication system responsive to said dialing for transmitting call related data to said one of said message service systems via said exchanging means;

means connected to said exchanging means and responsive to said call related data for forwarding to said user via said exchanging means and said message service system an indication of the message status of said user; and means in each of said message service systems responsive to said user generating a message retrieval request for forwarding via said exchanging means and said one message service system, unretrieved messages for said user stored on other than said one message service system.

10. The system of claim 9 wherein said storing means includes:

means responsive to said communication connection for providing said indication to said user via said communication connection.

11. The system of claim 10 wherein said system includes:

means in each of said message service systems responsive to the creation or accessing of a message stored therein for returning a message to said system processor via said exchanging means indicative of said creation or accessing; and means connected to said system processor and responsive to said indicative message for maintaining a record of said creation or accessing on a per user basis.

12. The system of claim 11 wherein said transmitting means includes:

means responsive to said dialing for accessing said record associated with said user; and means responsive to said accessed record for transferring said accessed record to said one message service system via said exchanging means.

13. The system of claim 10 wherein said system processor includes:

means responsive to said message retrieval request for broadcasting a user retrieval request via said data link means to all of said message service systems having unretrieved messages for said user as identified by said storing means; and means responsive to said unretrieved messages returned on said data link means by said identified message service systems for routing said unretrieved messages to said user via said data link connecting said system processor to said one message service system.

14. The system of claim 10 wherein said system processor includes:

means responsive to said message retrieval request for transferring said user to said communication lines associated with another one of said message service systems having unretrieved messages for said user as identified by said storing means; and means responsive to said transferring means for broadcasting a user retrieval request to said another message service system identifying said user.

15. In a business communication system which comprises a telephone communication system and a plurality of message service systems, wherein said message service systems are connected to said telephone communication system by communication lines which provide users on said telephone communication system with dial access to said message service systems, a method of providing an integrated message access service comprising the steps of:

storing in a central memory, whenever a user accesses one of said plurality of message service systems to either create or access a message stored in said message service system, data relating to the status of said message;

transmitting to a user in response to said user accessing one of said message service systems said message status data relating to all messages associated with said user to indicate the location of all messages associated with said user in all of said plurality of message service systems; and forwarding all unretrieved messages for said user stored on other than said one message service system in response to a message retrieval request from said user.

16. The method of claim 15 wherein said step of storing includes the step of:

forwarding a signal to said central memory from said message service system indicative of the creation or accessing of a message thereon.

17. The method of claim 16 wherein said step of storing includes the steps of:

updating said memory in response to said signal.

18. The method of claim 15 wherein the step of forwarding includes the steps of:

transferring said user to a communication line associated with another message service system which contains unretrieved messages for said user; and broadcasting a user retrieval request message to said another message service system to identify said user on said communication line.

19. The method of claim 15 wherein the step of forwarding includes the steps of:

broadcasting a user retrieval request message to another message service system which contains unretrieved messages for said user; and routing said unretrieved messages which are returned by said another message service system to said user on said one message service system.

* * * * *